(12) United States Patent
Flores Marin et al.

(10) Patent No.: US 10,399,501 B2
(45) Date of Patent: Sep. 3, 2019

(54) CONCEALABLE VEHICLE CARGO AREA STORAGE SYSTEM

(71) Applicant: GM GLOBAL TECHNOLOGY OPERATIONS LLC, Detroit, MI (US)

(72) Inventors: Pamela Flores Marin, Mexico (MX); Gustavo Eduardo Valencia Cruz, Pedregal de Carrasco (MX); Frederick Pastrana Dominguez, Zacatlan (MX); Sandra Irais Nieto Gonzalez, Calimaya (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 15/886,258

(22) Filed: Feb. 1, 2018

(65) Prior Publication Data
US 2019/0232875 A1    Aug. 1, 2019

(51) Int. Cl.
*B60R 5/04* (2006.01)
*B65D 6/16* (2006.01)
*B60R 11/00* (2006.01)

(52) U.S. Cl.
CPC ............... *B60R 5/045* (2013.01); *B65D 7/24* (2013.01); *B60R 2011/0036* (2013.01); *B60R 2011/0045* (2013.01); *B60R 2011/0082* (2013.01)

(58) Field of Classification Search
CPC .......... B60R 5/04; B60R 5/045; B60R 5/048; B60R 7/02
USPC ............................ 296/24.4, 37.5, 37.8, 37.16
See application file for complete search history.

(56) References Cited

U.S. PATENT DOCUMENTS

| | | | | |
|---|---|---|---|---|
| 5,772,058 | A * | 6/1998 | Staesche | B60R 7/02 220/520 |
| 6,375,055 | B1 * | 4/2002 | Spykerman | B60R 5/045 108/12 |
| 7,143,932 | B2 | 12/2006 | Wang | |
| 7,201,421 | B2 * | 4/2007 | Reynolds | B60R 7/02 224/400 |

(Continued)

OTHER PUBLICATIONS

Drive Auto Products, Product Website: Car Trunk Organizer, Dec. 20, 2017, Product website: https://driveautoproducts.com/products/trunk-organizer.

(Continued)

*Primary Examiner* — Jason S Daniels

(57) ABSTRACT

A cargo area storage system including: a foldable cover assembly including: first and second substantially rectangular panels in a parallel relationship and being pivotally connected such that the panels can fold in relation to one another to form the cover assembly into an erect configuration or to have a common plane configuration; a storage container affixed to the second panel, the storage container having one or more storage compartments, the storage container being a foldable, top open container; and where, when the first and second panels are in the erect configuration, the storage container can be made into an unfolded configuration to establish the one or more storage compartments to store one or more items, and where, when the first and second panels are in the common plane configuration, the storage container can be made into a folded configuration and concealed from the cargo area.

18 Claims, 9 Drawing Sheets

(56) References Cited

U.S. PATENT DOCUMENTS

| | | | |
|---|---|---|---|
| 8,215,693 B2* | 7/2012 | Ulita | B60R 7/02 |
| | | | 296/37.1 |
| 8,757,695 B2* | 6/2014 | Dinger | B60R 7/02 |
| | | | 296/37.5 |
| 2006/0038423 A1* | 2/2006 | Nilsrud | B60R 7/02 |
| | | | 296/37.5 |
| 2007/0241154 A1* | 10/2007 | Potts | B60R 7/02 |
| | | | 224/539 |
| 2010/0264180 A1 | 10/2010 | Allotey | |
| 2015/0175080 A1* | 6/2015 | Kmita | B60R 7/02 |
| | | | 296/37.5 |
| 2016/0144800 A1* | 5/2016 | Henderson | B60R 13/013 |
| | | | 296/24.4 |

OTHER PUBLICATIONS

Alejandro Hernandez Covarrubias, San Mateo, U.S. Appl. No. 15/675,201, Vehicle Cargo Canopy With Hazard Warning Sign, United States.

\* cited by examiner

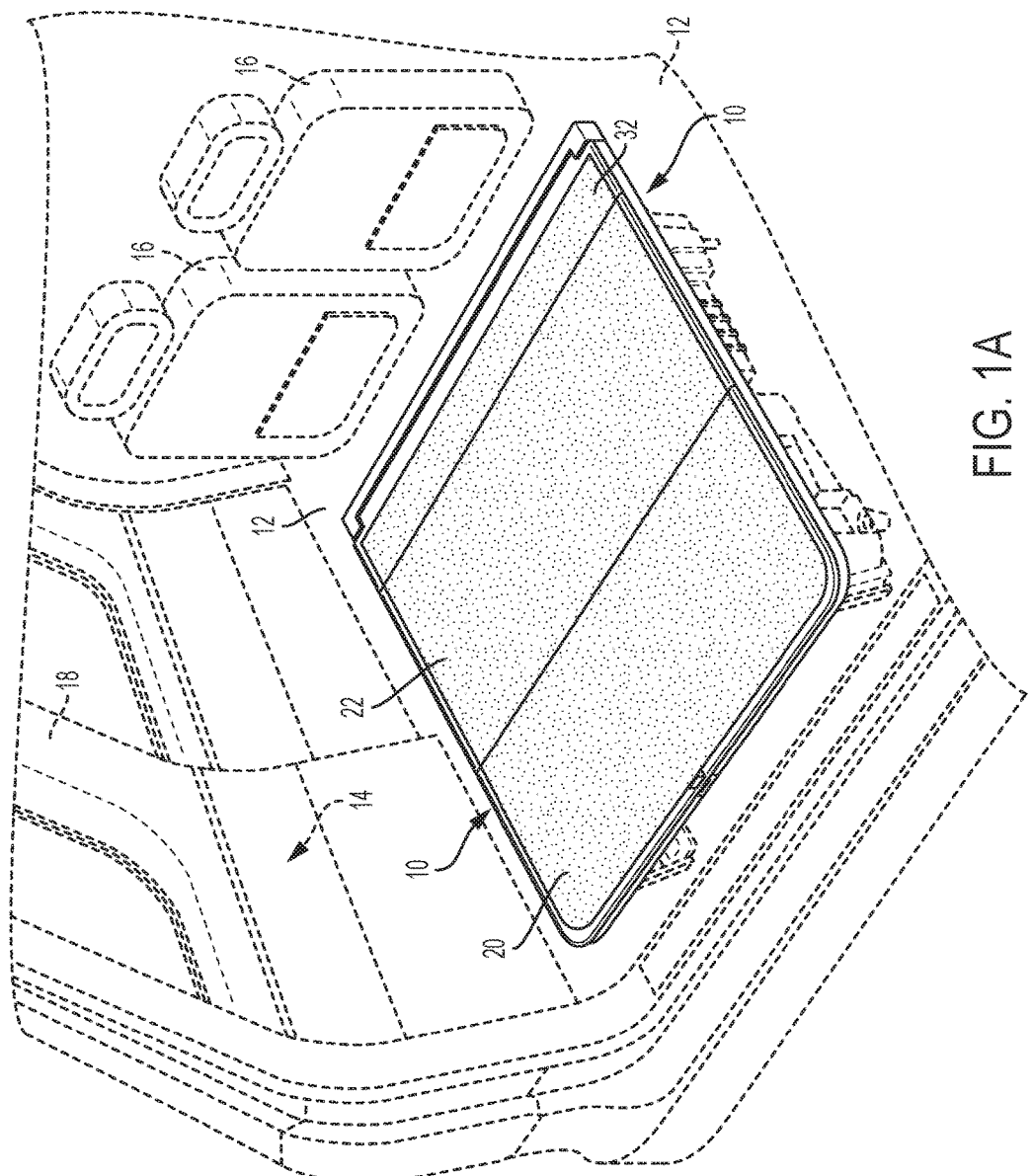

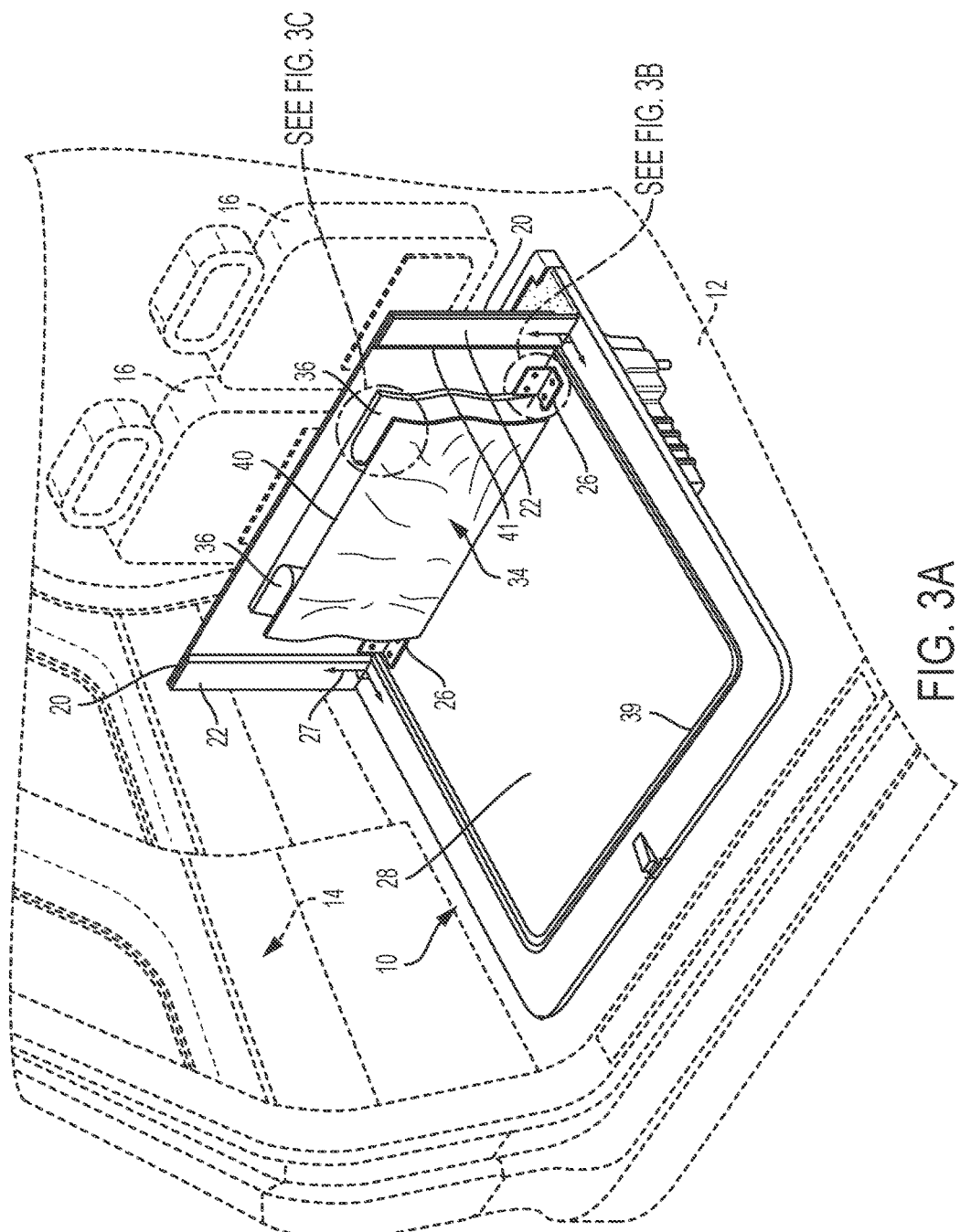

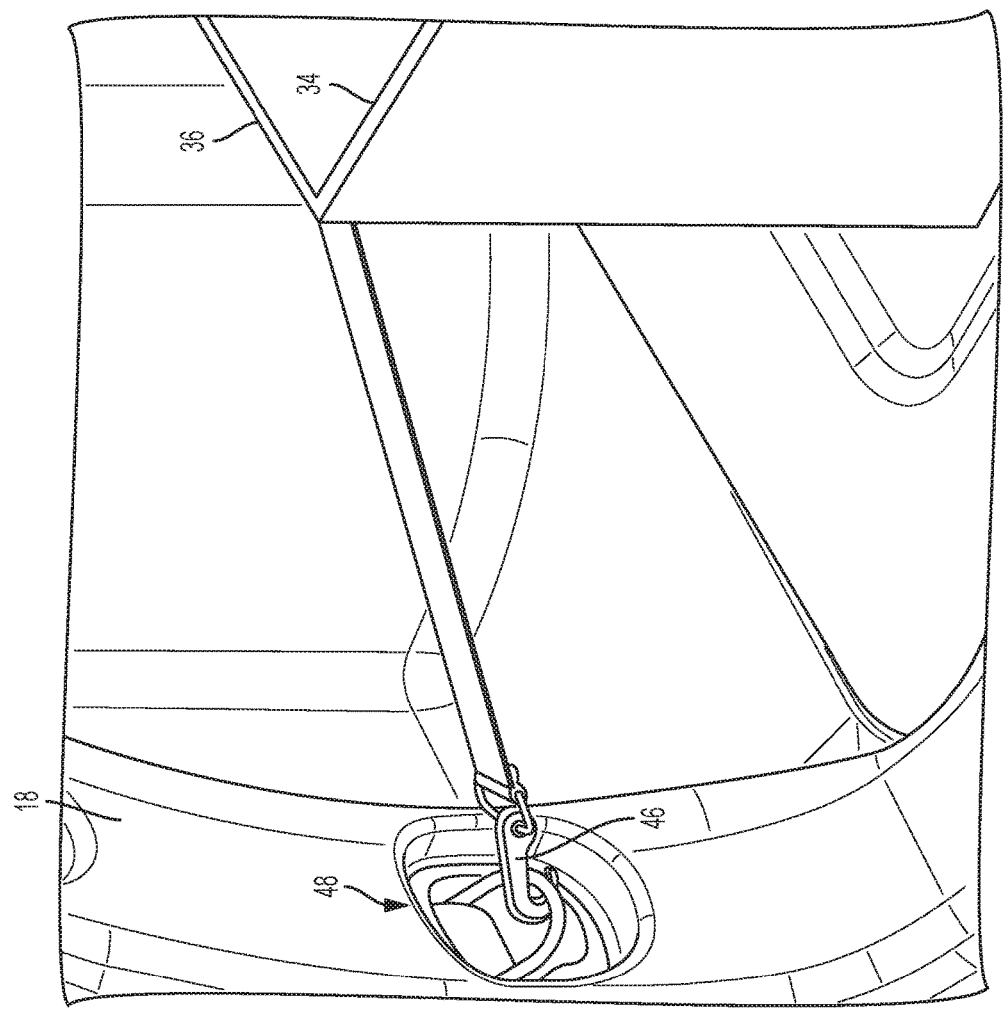

CONCEALABLE VEHICLE CARGO AREA STORAGE SYSTEM

INTRODUCTION

The present disclosure relates to a deployable cargo organizer for use in the cargo area of a vehicle. Vehicles typically include an area that can be used to transport various types of cargo. Such cargo areas can have multiple types of configurations such as a load floor in a sport utility, crossover or hatchback vehicle or a trunk in a sedan. In these types of cargo areas and in others, the floor can be a large planar area that is often used to store and/or transport various items such as groceries, luggage, sports equipment, tools, bags, household goods, briefcases, office supplies, child care items, toys, other purchases and the like. When in transit, however, these items tend to get unorganized by tipping over and being scattered around the cargo area. It is therefore desirable to organize these items and restrict their movement so they cannot scatter and fall over, to make a mess during vehicle transit.

SUMMARY

One general aspect includes a cargo area storage system including: a foldable cover assembly for selectively covering a floor of a vehicle cargo area, the cover assembly including: first and second substantially rectangular panels in a parallel relationship, the first and second panels being pivotally connected such that the panels can fold in relation to one another so as to form the cover assembly into a substantially erect configuration or the panels can fold open to bring the first and second panels to have a common plane configuration that can substantially overlap the cargo area floor; a storage container affixed to the second panel, the storage container having one or more storage compartments, the storage container being a foldable, top open container made of flexible material; and where, when the first and second panels are in the substantially erect configuration, the storage container is exposed to the cargo area and can be made into an unfolded configuration to establish the one or more storage compartments to store one or more items, and where, when the first and second panels are in the common plane configuration, the storage container can be made into a folded configuration and concealed from the cargo area.

Implementations may include one or more of the following features. The storage system further including one or more mechanical hinges to connect the second panel to the floor of the cargo area in a pivotable manner. The storage system where a flexible living hinge adjacently connects the first and second panels and the living hinge extends along the width of the adjacent first and second panels. The storage system where the vehicle cargo area is generally formed behind one or more vehicle seats and between spaced interior sidewalls of a vehicle. The storage system where the first and second panels include a carpet layer configured to be exposed in the cargo area when the first and second panels have the common plane configuration. The storage system where the first and second panels are 90 degrees relative to the cargo area floor when in the substantially erect configuration. The storage system where the cargo area floor includes an elastomeric material layer. The storage system where the storage container includes a plurality of tethered coupling devices, each coupling device configured to operatively attach to a respective attachment point located on one or more cargo area sidewalls to maintain the storage container in the unfolded configuration. The storage system where: the storage container has two sidewalls being foldable and unfoldable relative to each other by rotation at a crease, the storage container further has a rear wall joined to the sidewalls; where, when the storage container is in the folded configuration, the sidewalls are pivoted via the crease into positions substantially parallel to and pressed against the second panel and the rear wall is substantially pressed against the substantially parallel side walls. The storage system where the rear wall of the storage container is reinforced by a rigid material. The storage system where: the one or more storage compartments are defined by a plurality of foldable partitions; where each end of each partition is stitched at each end to an interior surface of the storage container; where, when in an unfolded orientation, each partition abuts a respective corner of the storage container interior; and where, when in a folded orientation, each partition has an inverse perpendicular relationship with the respective corner to create a storage compartment defined by the area between the respective corner and partition. The storage system where each foldable partition is reinforced by one or more boards.

One general aspect includes a vehicle including: a cargo area generally formed behind one or more vehicle seats and between spaced interior sidewalls of a vehicle; a foldable cover assembly installed in the cargo area, the cover assembly for selectively covering a floor of the cargo area, the cover assembly including: first and second rigid panels in a parallel relationship; the first and second panels being pivotally connected such that the panels can fold in relation to one another so as to form the cover assembly into a substantially erect configuration or the panels can fold open to bring the first and second panels to have a common plane configuration that substantially overlaps the cargo area floor; a storage container affixed to the second panel, the storage container having one or more storage compartments, the storage container being a foldable, top open container made of flexible material; and where, when the first and second panels are in the substantially erect configuration, the storage container is exposed to the cargo area and can be made into an unfolded configuration to establish the one or more storage compartments to store one or more items, and where, when the first and second panels are in the common plane configuration, the storage container is in a folded configuration and concealed from the cargo area.

Implementations may include one or more of the following features. The vehicle further including one or more mechanical hinges mounted to the cargo area floor, where the one or more mechanical hinges connect the second panel to the cargo area floor in a pivotable manner. The vehicle where a flexible living hinge adjacently connects the first and second panels and the living hinge extends along the width of the adjacent first and second panels. The vehicle where the first and second panels include a carpet layer configured to be exposed in the cargo area when the first and second panels have the common plane configuration. The vehicle where the cargo area floor includes an elastomeric material layer. The vehicle where the storage container includes a plurality of tethered hook devices, each hook device configured to operatively attach to a respective tie down anchor located on the respective interior vehicle sidewall to maintain the storage container in the unfolded configuration. The vehicle where: the storage container has two sidewalls being foldable and unfoldable relative to each other by rotation at a crease, the storage container further has a rear wall joined to the sidewalls; where, when the storage container is in the folded configuration, the sidewalls are pivoted via the crease into positions substantially parallel to and pressed against the second panel and the rear wall is substantially pressed against the substantially parallel side walls. The vehicle where: the one or more storage compartments are defined by a plurality of foldable partitions; where each end of each partition is stitched at each end to an interior surface of the storage container; where, when in an unfolded orientation, each partition abuts a respective corner of the storage container interior; and where, when in a folded orientation, each partition has an inverse perpendicular relationship with the respective corner to create a storage compartment defined by the area between the respective corner and partition.

The above features and advantages and other features and advantages of the present teachings are readily apparent from the following detailed description for carrying out the teachings when taken in connection with the accompanying drawings.

BRIEF DESCRIPTION OF THE DRAWINGS

FIG. 1A is a perspective view of an exemplary vehicle cargo area storage system according to an aspect;

FIG. 3A is a perspective view of the exemplary storage system according to another aspect;

FIG. 5 is a perspective view of an exemplary retaining configuration for the exemplary storage compartment according to an aspect;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1B:
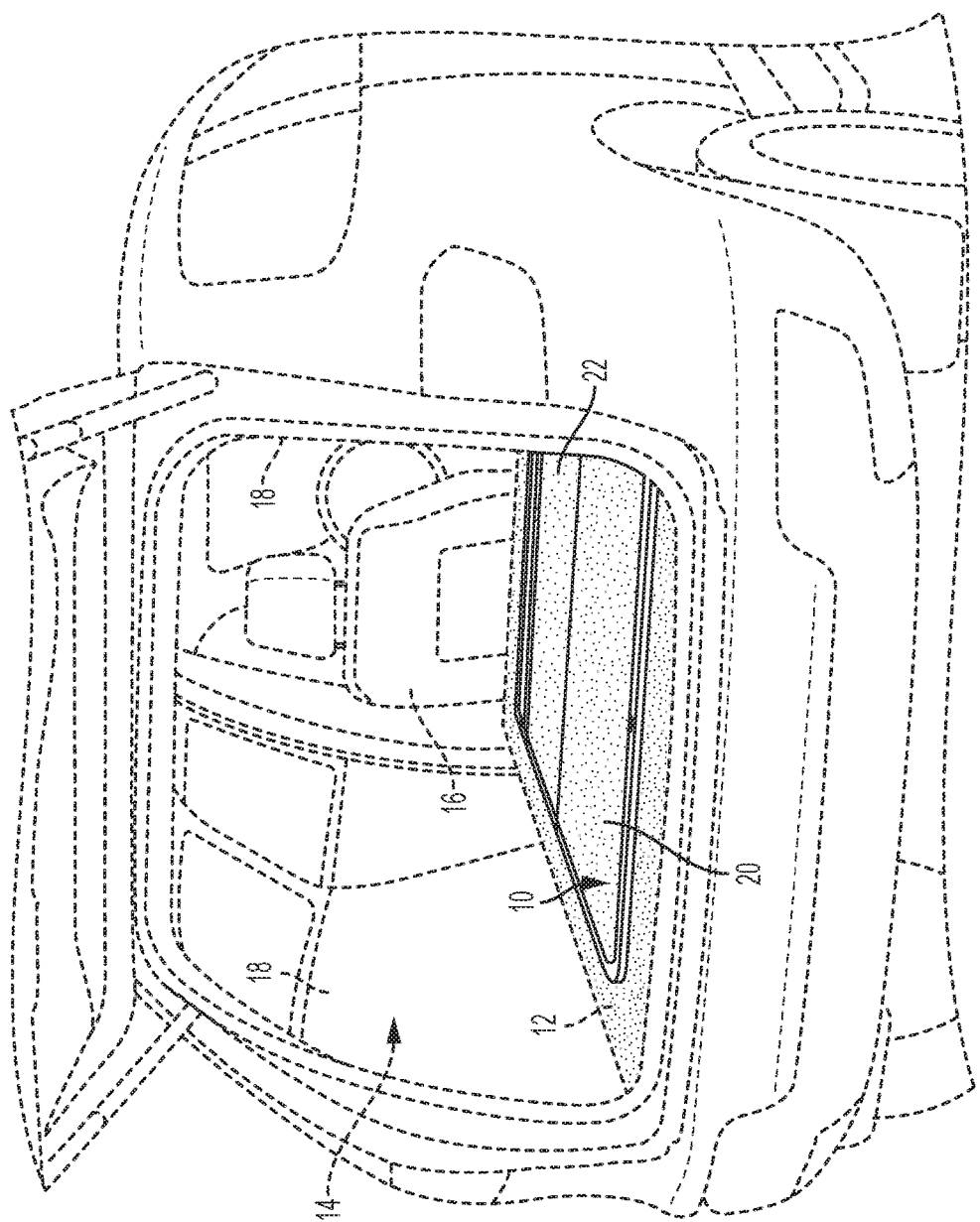
FIG. 1B is another perspective view of the exemplary vehicle cargo area storage system of FIG. 1A.

As shown in FIGS. 1A and 1B, a foldable cover assembly incorporating a deployable storage container has been generally indicated by reference numeral 10. Under normal circumstances, cover assembly 10 is adapted to cover the floor 12 of vehicle cargo area 14 in a selected manner and may otherwise be known as, for example, a "cargo cover" or "tonneau cover." Cover assembly 10 may cover selected portions of the cargo area floor 12 of certain vehicle types such as, for example, Sport Utility Vehicles (SUV) and Pickup Trucks (e.g., the bed). When installed in an SUV, the cover assembly 10 can be formed behind a pair of the vehicle's seats 16 ($1^{st}$ or $2^{nd}$ row seating) and between spaced interior sidewalls 18.

Figure 2:
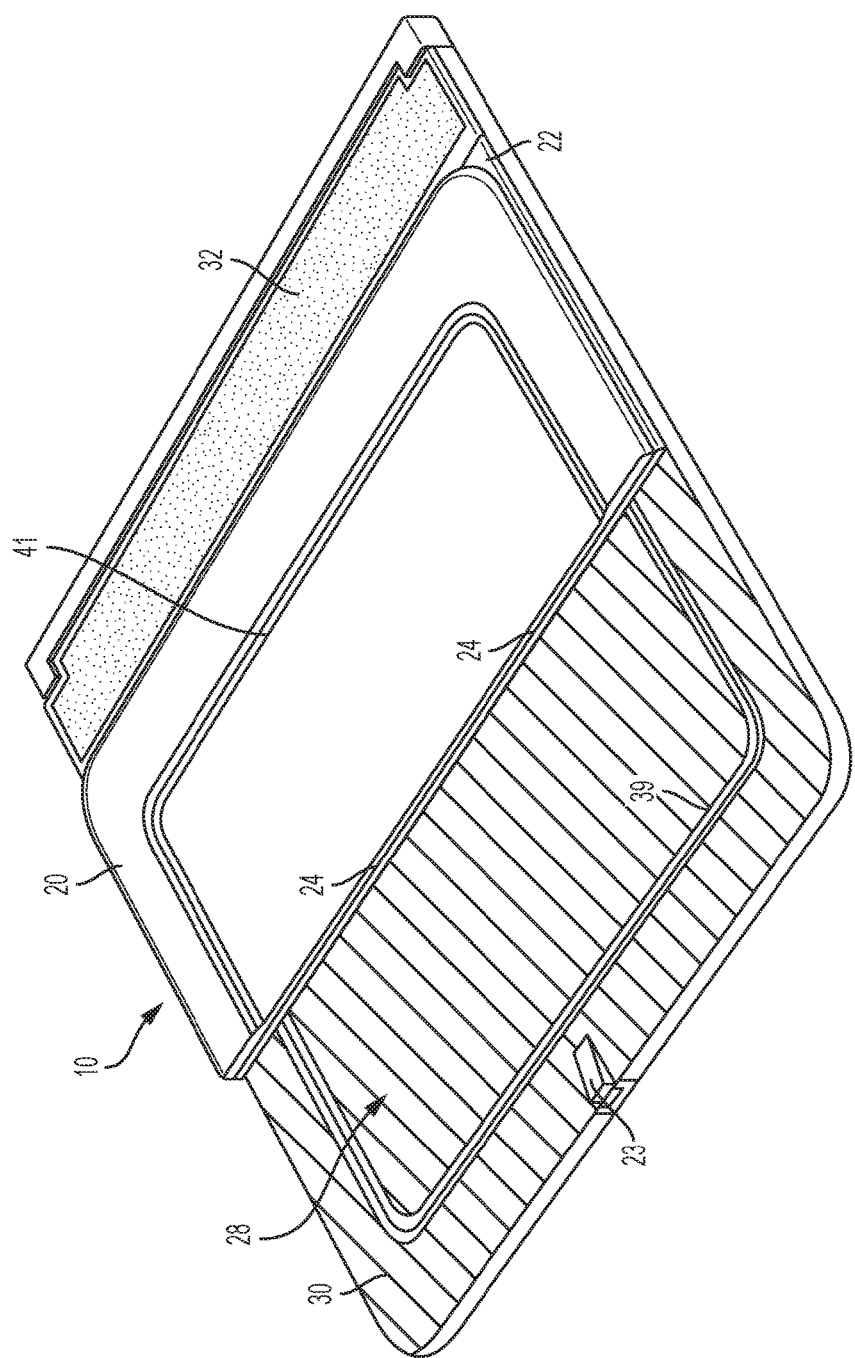
FIG. 2 is a perspective view of the exemplary storage system according to another aspect.

Cover assembly includes two distinct panels, a first cover panel 20 and a second cover panel 22, connected to each other in a parallel relationship and manufactured from rigid material such as, but not limited to, plastic, metal, or fiberglass. These panels 20, 22 also have a substantially rectangular shape and rest in a common plane configuration which is coplanar with cargo area floor 12 and substantially overlaps a baseboard installed onto cargo area floor 12. Moreover, as shown in FIG. 2, a living hinge 24, which extends along the width of cover assembly 10, is interposed between the adjacent first and second panels 20, 22 and enables the first panel 20 to pivotably fold away from baseboard 28 and press against second panel 22. A latch 23 may be implemented to hold the first panel 20 down while coplanar with the cargo area floor 12 and released to allow flipping of the first panel 20 back onto the second panel 22. A handle (not shown) may also be attached to the backside of first panel 20 to help fold the panel away from baseboard 28. Skilled artisans will also see that the backside of the first and second panels 20, 22 may include a layer of carpet 32 (indicated by the speckled texture) which can be exposed to the rest of cargo area 14 while the panels are in the common plane configuration.

Figure 3C:
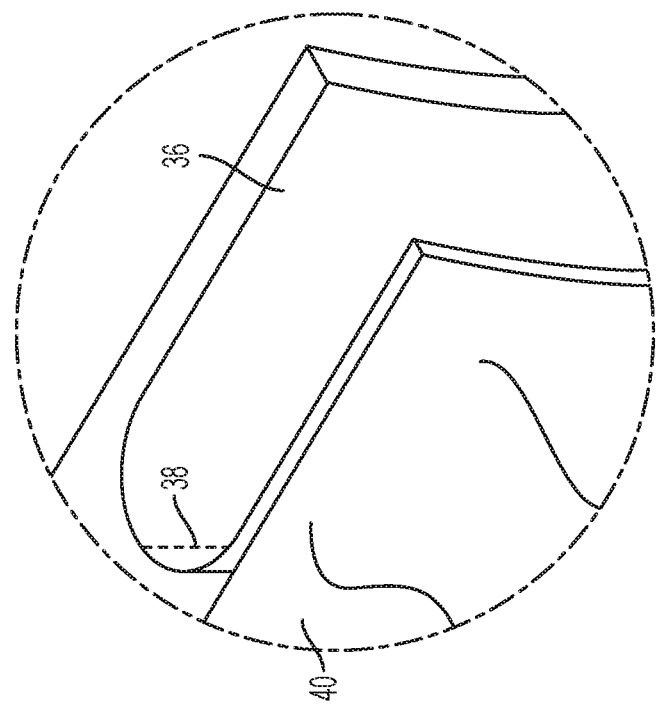
FIG. 3C is a perspective view of a folded corner of the storage container of the exemplary vehicle cargo area storage system of FIG. 3A.
Figure 3B:
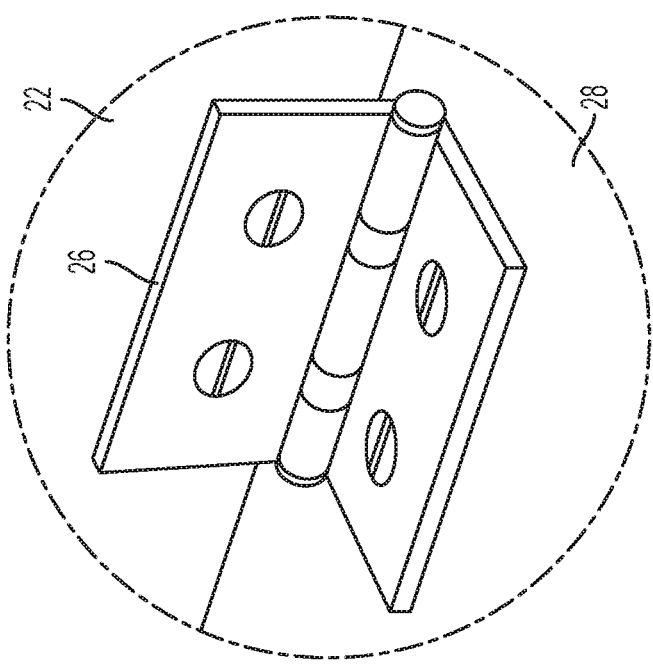
FIG. 3B is a perspective view of a mechanical hinge of the exemplary vehicle cargo area storage system of FIG. 3A.

As shown in FIGS. 3A through 3C, a pair of mechanical hinges 26 (e.g., a raised barrel hinge) also pivotably connect the second panel 22 to baseboard 28 and enable the second panel 22 to fold relative to cargo area floor 12, in the direction of the vehicle seats 16, and away from baseboard 28. As a result, when the first and second panels 20, 22 are properly folded in relation to each other, they will form into an erect configuration wherein the first and second panels 20, 22 are generally pressed together while standing upright (i.e., 90 degrees relative to the cargo area floor 12—as indicated by the arrows 27). Skilled artisans will understand that baseboard 28 is the portion of cargo area floor 12 which may removably cover a spare tire well (not shown).

With additional reference back to FIG. 2, a layer of elastomeric material, for example, polyurethane elastomer 30 (represented by the diagonal lines) may be affixed to the backside of baseboard 28 for heavy duty usage of vehicle cargo area 14. For example, upon forming the first and second panels 20, 22 into the erect configuration, large objects (e.g., bicycles, construction equipment, etc.) may be placed on the cargo area floor 12 without incurring damage to the first and/or second panels 20, 22 or layer of carpet 32 (if such a layer exists). This polyurethane elastomer layer 30 can also be useful for placing dirt and/or dust covered objects without staining the first and/or second panels 20, 22 or layer of carpet 32. Skilled artisans will also see that polyurethane elastomer layer 30 can also provide a traction pattern to help maintain proper positioning of the first and second panels 20, 22 while in the common plane configuration.

A collapsible, top open storage container 34 made of generally flexible soft sheet material, for example, canvass is affixed (e.g., via joining mechanisms such as screws or tacks or via an adhesive) to the frontside of second panel 22. As such, this foldable storage container 34 is exposed to the rest of cargo area 14 when the panels 20, 22 are in the erect configuration (see FIG. 3A) and concealed when the panels 20, 22 are in the common plane configuration (see FIG. 1). With additional reference to FIG. 3C, while container 34 is exposed, its two sidewalls 36 can be folded relative to each other at a crease 38 and towards the container's center. Moreover, when folded, both sidewalls 36 are bent at crease 38 to such an extent that they become defined by two segments that are substantially parallel to second panel 22, with one segment being pressed against the panel's frontside. The container's rear wall 40 is also pressed against these folded segments such that the segments are tightly interposed between rear wall 40 and second panel 22. In the broader sense, such folding allows storage container 34 to collapse to be substantially flat as rear wall 40 is moved towards the frontside of second panel 22. With additional reference to FIG. 2, baseboard 28 and the frontside of second panel 22 may also include corresponding recesses 39, 41 that provide an area to stow the folded storage container 34 in a concealed manner while the panels 20, 22 have the common plane configuration.

Figure 4:
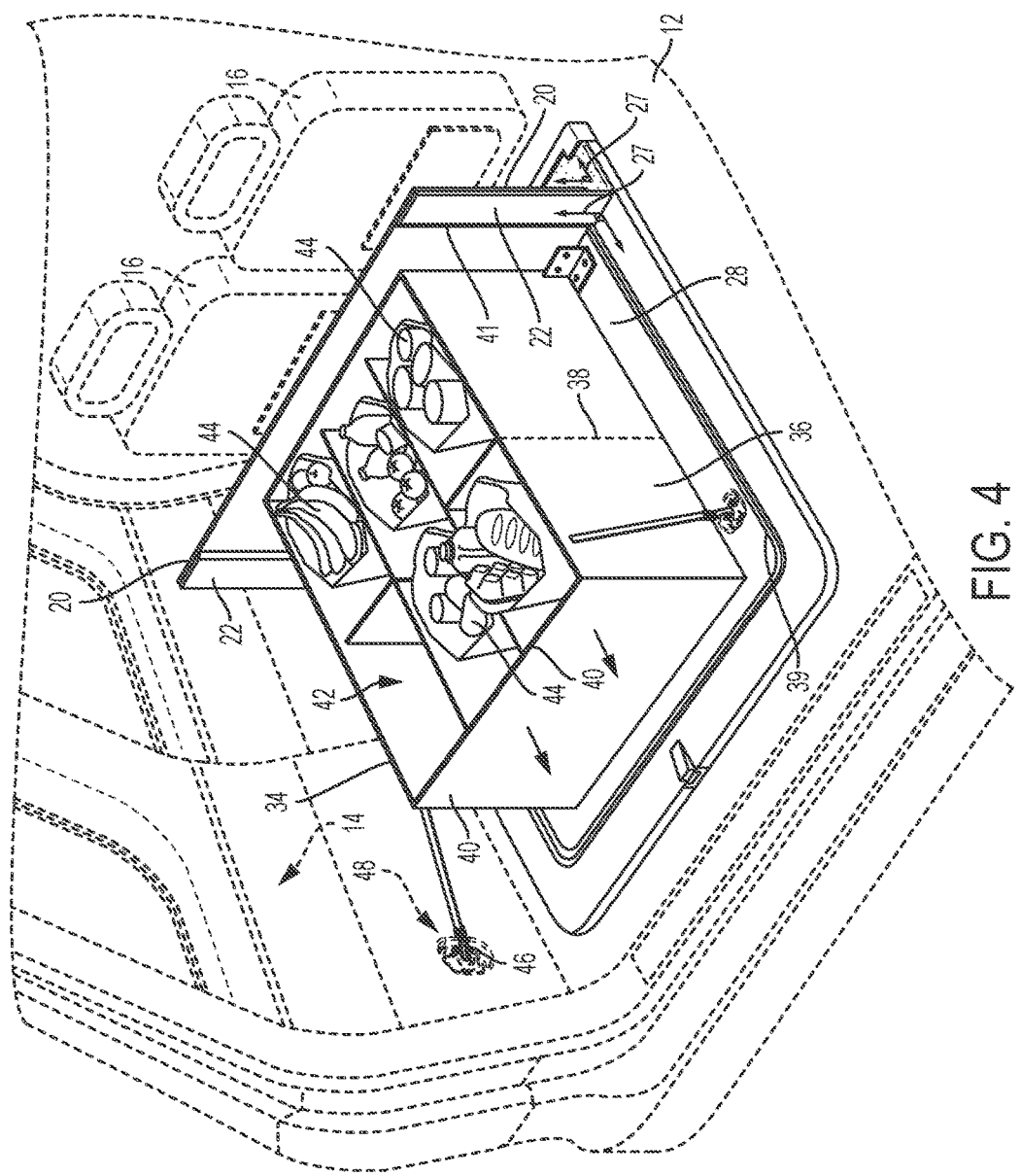
FIG. 4 is a perspective view of the exemplary storage system according to another aspect.

As shown in FIG. 4, the container 34 can otherwise be unfolded by being pulled/dragged towards the rear end of cargo area 14, which allows the sidewalls 36 to unfold by pivoting away from the container's center. Furthermore, when container 34 is unfolded, numerous storage compartments 42 can be established to allow items such as, but not limited to, groceries 44 to be deposited and maintained in an organized manner, for example, during vehicle travel. With further reference to FIG. 5, storage container 34 can be maintained in an unfolded configuration through the implementation of hooks 46 (e.g., carabiners) which are tethered to storage container 34 (e.g., at or near one of the container's corners). As shown, each hook 46 may be operatively attached to a respective tie down anchor 48 (e.g., a metal loop) which has been installed onto one of the interior sidewalls 18.

Figure 6A:
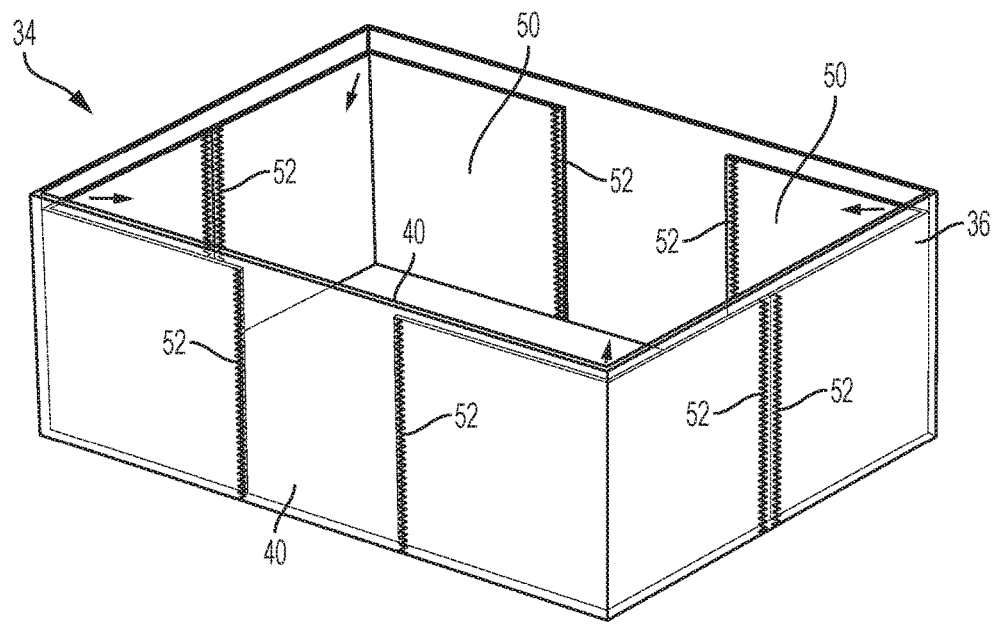
FIG. 6A is a perspective view of an exemplary storage container of the exemplary storage system according to an aspect.
Figure 6B:
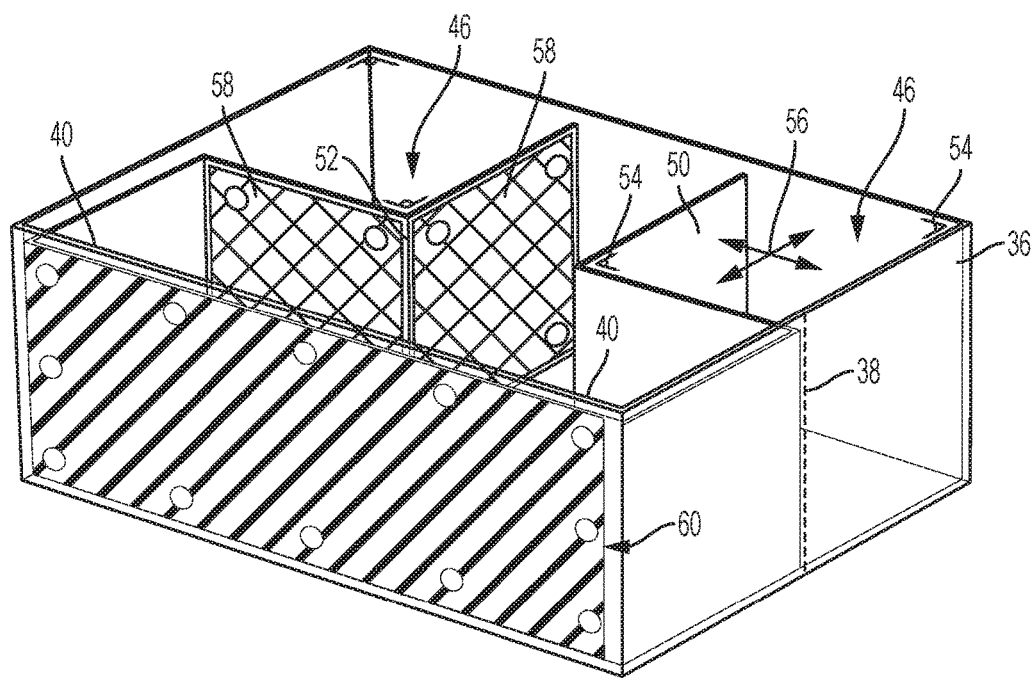
FIG. 6B is a perspective view of the exemplary storage container according to another aspect.
Figure 6C:
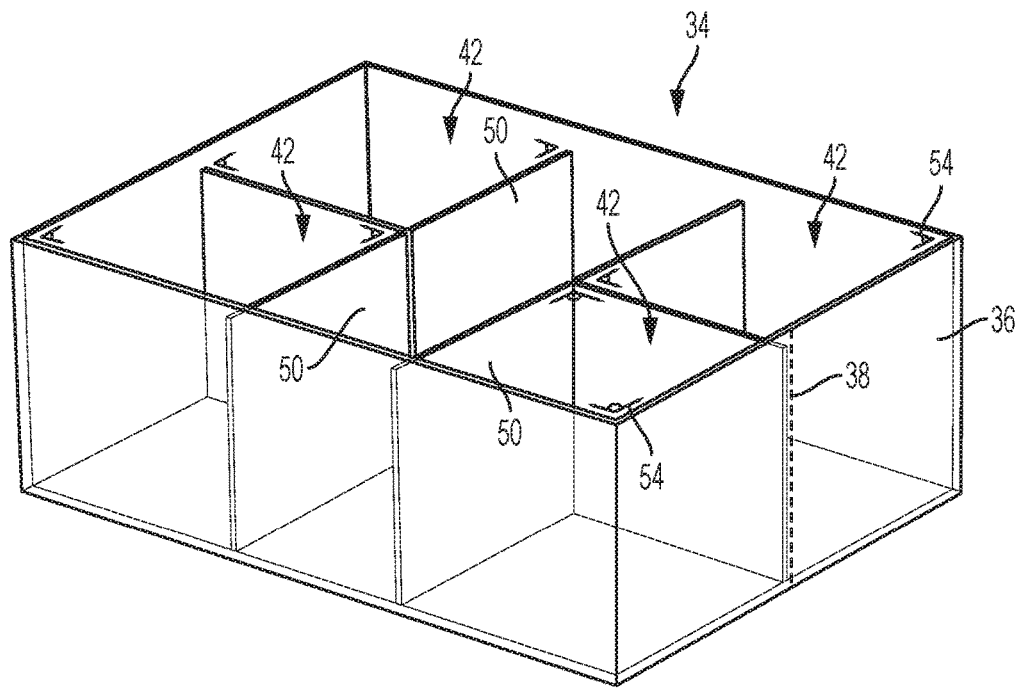
FIG. 6C is a perspective view of the exemplary storage container according to another aspect.
Figure 6D:
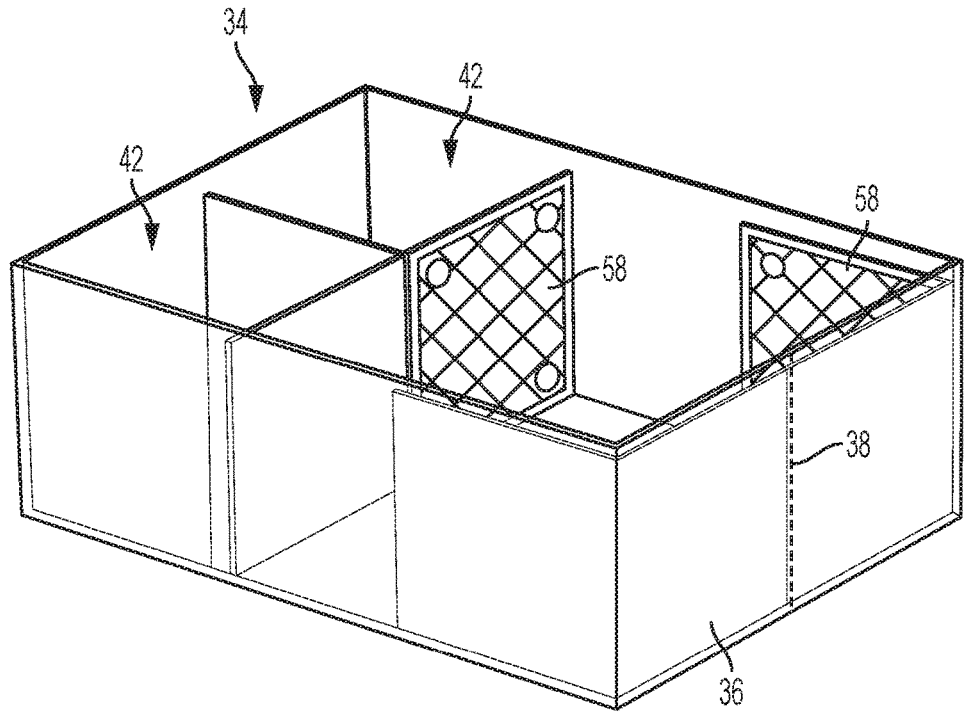
FIG. 6D is a perspective view of the exemplary storage container according to another aspect.

As shown in FIGS. 6A through 6D, each storage compartment 42 can be defined by the area between an unfolded partition 50 made of flexible material such as canvass and the respective corner of container 34. As such, when in an unfolded orientation, each partition 50 is pressed against and conforms to the interior surface of the container's respective corner 34. However, when folded open, each partition is moved towards the center location of container 34 and centrally bent at a crease 52 to have an inverse perpendicular relationship with the respective corner (as represented by angle indicators 54) that divides the holding space of the container interior 34 into multiple storage compartments 42. Thus, when properly established, each storage compartment 42 will have a square cross section 56 and be defined on two sides by the corresponding partition 50 and the other two sides by the respective interior corner of container 34. Moreover, two boards 58 of light semi-flexible plastic material may be fastened (e.g., tacks) to either side of each partition 50 and around the central crease 54 to reinforce the sides the storage compartment established by the partition 50. These boards 58 may also maintain and stabilize the corresponding partition 50 while unfolded. Skilled artisans will also see the partitions 50 can help stabilize the exposed container 34 regardless of being folded or unfolded. With reference to FIG. 6B, a board 60 of rigid material (e.g., plastic, metal, fiberglass) may also be fastened (e.g., tacks) to the rear wall 40 to maintain and stabilize the shape of the container 34 when in the unfolded configuration. With reference to FIG. 6D, skilled artisans will see that various configurations of storage compartments 42 may be established within the confines of container 34.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A cargo area storage system comprising:
    a foldable cover assembly for selectively covering a floor of a vehicle cargo area, the cover assembly comprising:
        first and second substantially rectangular panels in a parallel relationship, wherein a flexible living hinge adjacently connects the first and second panels and the living hinge extends along the width of the adjacent first and second panels; and
        the first and second panels being pivotally connected such that the panels can fold in relation to one another so as to form the cover assembly into a substantially erect configuration or the panels can fold open to bring the first and second panels to have a common plane configuration that can substantially overlap the cargo area floor;
a storage container affixed to the second panel, the storage container having one or more storage compartments, the storage container being a foldable, top open container made of flexible material; and
wherein, when the first and second panels are in the substantially erect configuration, the storage container is exposed to the cargo area and can be made into an unfolded configuration to establish the one or more storage compartments to store one or more items, and wherein, when the first and second panels are in the common plane configuration, the storage container can be made into a folded configuration and concealed from the cargo area.

2. The storage system of claim 1, further comprising one or more mechanical hinges to connect the second panel to the floor of the cargo area in a pivotable manner.

3. The storage system of claim 1, wherein the vehicle cargo area is generally formed behind one or more vehicle seats and between spaced interior sidewalls of a vehicle.

4. The storage system of claim 1, wherein the first and second panels include a carpet layer configured to be exposed in the cargo area when the first and second panels have the common plane configuration.

5. The storage system of claim 1, wherein the first and second panels are 90 degrees relative to the cargo area floor when in the substantially erect configuration.

6. The storage system of claim 1, wherein the cargo area floor includes an elastomeric material layer.

7. The storage system of claim 1, wherein the storage container includes a plurality of tethered coupling devices, each coupling device configured to operatively attach to a respective attachment point located on one or more cargo area sidewalls to maintain the storage container in the unfolded configuration.

8. The storage system of claim 1, wherein:
the storage container has two sidewalls being foldable and unfoldable relative to each other by rotation at a crease, the storage container further has a rear wall joined to the sidewalls; and
wherein, when the storage container is in the folded configuration, the sidewalls are pivoted via the crease into positions substantially parallel to and pressed against the second panel and the rear wall is substantially pressed against the substantially parallel side walls.

9. The storage system of claim 1, wherein the rear wall of the storage container is reinforced by a rigid material.

10. The storage system of claim 1, wherein:
the one or more storage compartments are defined by a plurality of foldable partitions;
wherein each end of each partition is stitched at each end to an interior surface of the storage container;
wherein, when in an unfolded orientation, each partition abuts a respective corner of the storage container interior; and
wherein, when in a folded orientation, each partition has an inverse perpendicular relationship with the respective corner to create a storage compartment defined by the area between the respective corner and partition.

11. The storage system of claim 10, wherein each foldable partition is reinforced by one or more boards.

12. A vehicle comprising:
a cargo area generally formed behind one or more vehicle seats and between spaced interior sidewalls of a vehicle;
a foldable cover assembly installed in the cargo area, the cover assembly for selectively covering a floor of the cargo area, the cover assembly comprising:
first and second rigid panels in a parallel relationship, wherein a flexible living hinge adjacently connects the first and second panels and the living hinge extends along the width of the adjacent first and second panels; and
the first and second panels being pivotally connected such that the panels can fold in relation to one another so as to form the cover assembly into a substantially erect configuration or the panels can fold open to bring the first and second panels to have a common plane configuration that substantially overlaps the cargo area floor;
a storage container affixed to the second panel, the storage container having one or more storage compartments, the storage container being a foldable, top open container made of flexible material; and
wherein, when the first and second panels are in the substantially erect configuration, the storage container is exposed to the cargo area and can be made into an unfolded configuration to establish the one or more storage compartments to store one or more items, and wherein, when the first and second panels are in the common plane configuration, the storage container is in a folded configuration and concealed from the cargo area.

13. The vehicle of claim 12, further comprising one or more mechanical hinges mounted to the cargo area floor, wherein the one or more mechanical hinges connect the second panel to the cargo area floor in a pivotable manner.

14. The vehicle of claim 12, wherein the first and second panels include a carpet layer configured to be exposed in the cargo area when the first and second panels have the common plane configuration.

15. The vehicle of claim 12, wherein the cargo area floor includes an elastomeric material layer.

16. The vehicle of claim 12, wherein the storage container includes a plurality of tethered hook devices, each hook device configured to operatively attach to a respective tie down anchor located on the respective interior vehicle sidewall to maintain the storage container in the unfolded configuration.

17. The vehicle of claim 12, wherein:
the storage container has two sidewalls being foldable and unfoldable relative to each other by rotation at a crease, the storage container further has a rear wall joined to the sidewalls; and
wherein, when the storage container is in the folded configuration, the sidewalls are pivoted via the crease into positions substantially parallel to and pressed against the second panel and the rear wall is substantially pressed against the substantially parallel side walls.

18. The vehicle of claim 12, wherein:
the one or more storage compartments are defined by a plurality of foldable partitions;
wherein each end of each partition is stitched at each end to an interior surface of the storage container;
wherein, when in an unfolded orientation, each partition abuts a respective corner of the storage container interior; and
wherein, when in a folded orientation, each partition has an inverse perpendicular relationship with the respective corner to create a storage compartment defined by the area between the respective corner and partition.

* * * * *